US011104127B2

(12) United States Patent
Tagansky et al.

(10) Patent No.: US 11,104,127 B2
(45) Date of Patent: Aug. 31, 2021

(54) MATERIAL DISPLACEMENT

(71) Applicant: HP Indigo B.V., Amstelveen (NL)

(72) Inventors: Boaz Tagansky, Ness Ziona (IL); Gil Fisher, Ness Ziona (IL); Michael Plotkin, Ness Ziona (IL); Mark Sandler, Ness Ziona (IL); Albert Teishev, Ness Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 16/617,167

(22) PCT Filed: Jun. 23, 2017

(86) PCT No.: PCT/EP2017/065496
§ 371 (c)(1),
(2) Date: Nov. 26, 2019

(87) PCT Pub. No.: WO2018/233842
PCT Pub. Date: Dec. 27, 2018

(65) Prior Publication Data
US 2020/0122460 A1   Apr. 23, 2020

(51) Int. Cl.
*B41J 2/09* (2006.01)
*B33Y 30/00* (2015.01)
*B33Y 50/02* (2015.01)
*B29C 64/393* (2017.01)
(Continued)

(52) U.S. Cl.
CPC .............. *B41J 2/09* (2013.01); *B29C 64/268* (2017.08); *B29C 64/393* (2017.08); *B33Y 30/00* (2014.12); *B33Y 50/02* (2014.12); *B41J 2/442* (2013.01)

(58) Field of Classification Search
CPC ..... B41J 2/09; B41J 2/442; B41J 2/005; B41J 2/07; B41J 2/435; B33Y 30/00; B33Y 50/02; B33Y 10/00; B29C 64/393; B29C 64/268; Y02P 10/25; B22F 10/10; B22F 10/00; B23K 26/146; B23K 26/342
See application file for complete search history.

(56) References Cited

U.S. PATENT DOCUMENTS

| 7,658,163 | B2 * | 2/2010 | Renn ................. C23C 4/12 118/308 |
| 9,364,831 | B2 | 6/2016 | Chiou et al. |
| 10,157,032 | B2 | 12/2018 | Neisler et al. |

(Continued)

FOREIGN PATENT DOCUMENTS

| CN | 1454121 | 11/2003 |
| CN | 101184989 | 5/2008 |

(Continued)

OTHER PUBLICATIONS

IP.com search (Year: 2021).*
(Continued)

*Primary Examiner* — Lisa Solomon
(74) *Attorney, Agent, or Firm* — Michael A Dryja

(57) ABSTRACT

A method comprises: providing a first stream of discrete volumes (908*b*) of material, and directing a pulsed laser beam (912) at a first discrete volume (908*b*) of material in the first stream of discrete volumes of material so as to interact with the first discrete volume of material and thereby displace the first discrete volume away from the first stream. An apparatus and a system for achieving such steps are also disclosed.

12 Claims, 5 Drawing Sheets

100

102 — Provide a first stream of discrete volumes of material

104 — Direct a pulsed laser beam at a first discrete volume of material in the first stream of discrete volumes of material so as to interact with the first discrete volume of material and thereby displace the first discrete volume away from the first stream

(51) Int. Cl.
*B29C 64/268* (2017.01)
*B41J 2/44* (2006.01)

(56) References Cited

U.S. PATENT DOCUMENTS

| | | |
|---|---|---|
| 2007/0181060 A1 | 8/2007 | Renn et al. |
| 2010/0108651 A1* | 5/2010 | Stahr ................. C03C 23/0025 |
| | | 219/121.69 |
| 2011/0030808 A1 | 2/2011 | Chiou et al. |
| 2014/0292864 A1 | 10/2014 | Motoyanagi et al. |
| 2016/0298220 A1 | 10/2016 | Bruck et al. |

FOREIGN PATENT DOCUMENTS

| | | |
|---|---|---|
| CN | 104070786 | 10/2014 |
| CN | 105618166 A | 6/2016 |
| CN | 104971788 B | 7/2016 |
| CN | 106041072 | 10/2016 |
| DE | 10157032 | 6/2003 |
| JP | 02143863 | 6/1990 |

OTHER PUBLICATIONS

"An Optical Method of Sorting Nanoparticles by Size," NIST, Aug. 17, 2016. Available at: <https://www.nist.gov/news-events/news/2016/08/optical-method-sorting-nanoparticles-size>.

"Lasertec 65 3D All IN 1: Laser Deposition Welding & Milling—additive Manufacturing in Milling Quality," Product Overview by DMG MORI, Nov. 12, 2014, Available at: <http://en.dmgmori.com/products/lasertec/lasertec-additivemanufacturing/lasertec-65-3d>.

* cited by examiner

MATERIAL DISPLACEMENT

BACKGROUND

In various technologies, it may be useful to be able to deposit material in a particular place, or displace material from one place to another. In some examples, material may be displaced in printing systems, such as two-dimensional printing systems, where print agent is distributed onto a printable substrate. In other examples, material may be displaced in additive manufacturing systems that generate three-dimensional objects on a layer-by-layer basis using build material.

BRIEF DESCRIPTION OF DRAWINGS

Examples will now be described, by way of non-limiting example, with reference to the accompanying drawings, in which.

DETAILED DESCRIPTION

In a two dimensional printing system, print agent, such as ink, may be deposited onto a printable substrate, such as paper, by a print head. In some examples, print agent is deposited from nozzles in the print head. In some printing systems, liquid print agent may be used while, in other printing systems, solid print agent may be used. In some examples, successive drops of print agent may be deposited from a nozzle in the print head onto the substrate at precise locations. The number of drops to be deposited within a particular area of the substrate, or within a particular period of time may depend on the nature of the print job being performed.

In an additive manufacturing system, liquid or solid print agent, referred to as build material, maybe deposited by a print agent distributor onto a print bed. In some examples of additive manufacturing, the build material may be deposited in precise locations to form a series of layers on the print bed. The layers may each be processed to form slices of an object to be manufactured. The build material may, in some additive manufacturing systems, be a powder-like material.

It may be useful to be able to deposit material or matter at precise locations on a surface in fields of technology other than printing and additive manufacturing.

As used herein, the expressions "discrete volumes of material", "defined volumes of matter" and "morsels of material" are used interchangeably.

Figure 1:
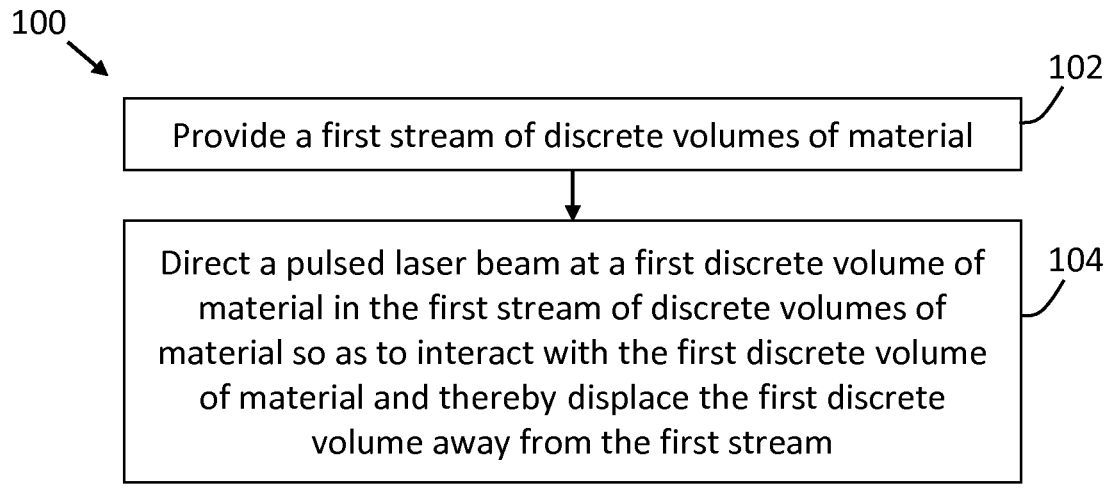
FIG. 1 is a flowchart of an example of a method of displacing material.

Methods disclosed herein relate to displacing material using radiation and, in particularly, using a beam of radiation. FIG. 1 is a flowchart showing an example of a method 100 for displacing material. The method 100 comprises, at block 102, providing a first stream of discrete volumes of material. The material may be in liquid or solid form, or may comprise a suspension of solid particles within a liquid, or a molten solid material.

Examples of solid material may include metals, plastics, ceramics, glass and the like. Discrete volumes of solid material may be formed by breaking the solid material into smaller volumes, or particles. In some examples, the solid material may exist as discrete volumes—for example, a powder-like material comprises a plurality of small particles of material—while in other examples, the solid material may be crushed or ground to create discrete volumes. By allowing the volumes of solid material to fall under gravity, or by controlling the supply of the discrete volumes of solid material, a stream of discrete volumes may be provided.

Examples of liquid material may include molten metals, molten plastics, molten glass, print agent (e.g. ink), and the like. Liquid material may be supplied in a continuous flow, or in a jet. In some examples, the jet of liquid material may be caused to break into droplets due to the effect of Plateau-Rayleigh instability. In other examples, the jet of liquid material may be caused to form discrete volumes. For example, a device may be used to form droplets of liquid material from a larger volume of the liquid material, or to break up a jet of the liquid material into discrete volumes. In some examples, a piezo-electric device may be used to introduce vibrations into the jet of liquid material, or into a piece of equipment through which the liquid material is to pass, to cause the liquid material to form into stable droplets. In this way, droplets of substantially equal size may be formed at a substantially constant rate.

In some examples, discrete volumes of solid or liquid material may be carried in a jet of gas, in a manner similar to an airbrush.

The discrete volumes of material may, in some examples, be the same size as one another, or substantially the same size as one another. The size of the discrete volumes of material may depend on the intended use of the material. In some examples, the discrete volumes of material may range in size from a few micrometres (e.g. around 10 micrometres) to hundreds of micrometres (e.g. around 500 micrometres).

The discrete volumes of material may be the same shape as one another, or substantially the same shape as one another. In examples where liquid material is used, the discrete volumes of liquid material may naturally form as droplets which may, in some examples, be substantially spherical and, in other examples, be amorphous. In examples where solid material is used, the shape of the discrete volumes of material may be selected, and the discrete volumes may be formed so as to have the intended shape. In some examples, substantially spherical volumes of solid material may be used.

While, in block 102, a first stream of discrete volumes is provided, in some examples, multiple streams of discrete volumes may be provided, as discussed below.

The method 100 comprises, at block 104, directing a pulsed laser beam at a first discrete volume of material in the first stream of discrete volumes of material so as to interact with the first discrete volume of material and thereby displace the first discrete volume away from the first stream.

The pulsed laser beam may be generated, for example, by a laser source such as a pulsed ytterbium fibre laser source. By directing the laser beam pulse at a discrete volume in the stream of discrete volumes, the laser beam may interact with the discrete volume in a number of ways. A first interaction may occur between the laser pulse and the discrete volume or material itself; the temperature of the portion of the discrete volume of material hit by the laser beam will be caused to increase. A rapid increase in temperature of the discrete volume may cause vapours and/or plasma to be formed from the material and ejected from the discrete volume of material. Most of the material ejected from the discrete volume is ejected in the direction from which the laser beam is incident. This rapid ejection of material causes an impulse force on the discrete volume, thereby urging the discrete volume in a direction opposite to the direction of the ejection of material. In this way, the discrete volume of material with which the laser pulse interacts may be displaced from the stream of discrete volumes. If gas is present around the discrete volume of material (i.e. if the stream of material is not provided in a vacuum), then a second interaction may occur between the laser pulse and some of the gas surrounding the discrete volume of material. The laser pulse may cause an increase in temperature of the gas near to the discrete volume of material and, in some examples, a rapid increase in temperature may result in the creation of a pressure wave, thereby contributing to the force experienced by the discrete volume to urge it away from the stream of discrete volumes. A third interaction between the laser pulse and the volume of material may occur in some examples if the lase pulse causes a chemical reaction to occur within the material. Such a chemical reaction may result in the creation of energy, which may contribute to the force experienced by the discrete volume to urge it away from the stream of discrete volumes.

The amount of displacement of the volume of material from the stream of volumes of material may depend on a number of factors including properties of the material, properties of the atmosphere surrounding the material and properties of the radiation interacting with the material. For example, the displacement may depend on the type of material, the size of the individual volumes of material, the shape of the individual volumes of material, the presence or absence of gas surrounding the material and, if present, the type of gas and/or the density of gas, the wavelength of the radiation, the frequency of the radiation, the power and/or energy of the radiation, the pulse duration and/or the spot size of the radiation beam when it interacts with the material. One, some or all of the above factors may be controlled in order to control the amount of displacement of the discrete volume of material. In some examples, factors other than those mentioned above may be controlled in order to control the displacement of the material.

In some examples, the pulse duration of the laser may be sufficiently short that the volume of material is effectively stationary when the laser pulse engages the material. In some examples, a pulse of the pulsed laser beam may have a pulse duration of less than around 100 nanoseconds. In other examples, the pulse duration may be between around 1 nanosecond and around 100 nanoseconds.

The energy of the laser beam may be selected based on the intended displacement of the volume of material from the stream of material. The energy of the laser beam may be selected based on, for example, the mass of the volume of material, the size of the spot to which the laser beam is focused at the point of engagement with the volume of material, the intended change in speed and/or trajectory of the volume of material, the material type and/or other parameters of the laser beam and/or laser source. In some examples, the energy of the radiation pulses directed at the material may be between around 20 microjoules and around 60 microjoules. In other examples, the range may be larger.

The wavelength of the laser beam may be selected based on the intended type of material to be displaced. In some examples, it may be intended that the volume of material absorbs energy from the laser beam near to the surface of the volume and, therefore not to be transparent to the laser beam. Thus, the wavelength of the radiation may fall within a range of wavelengths from ultraviolet (UV) to infrared (IR). In some examples, the wavelength of the radiation may be between around 10 nanometres and around 1 millimetre. In other examples, a wavelength of radiation within the range from around 400 nanometres to 10 micrometres might be used. In some examples, wavelengths of around 1.06 micrometres or 0.53 micrometres may be used.

Optical components may be used to focus and/or direct the laser beam. For example, an optical component, such as a lens, may be used to focus the laser beam so that, when the laser beam engages the volume of material, the laser beam has a particular spot size. The spot size of the laser beam where it interacts with the material may be selected depending on the size of the volumes of material. In some examples, the spot size may be smaller than around 100 micrometres. In some examples, the spot size of the laser beam may be larger than the size of the volume of material at which the laser is aimed. In such examples, the volume of material may be situated anywhere within the beam of the laser and the material will experience the maximum effect from the laser beam. In other example, the spot size of the laser may be smaller than the size of the volume of material at which the laser is aimed. In these examples, the laser beam may be directed such that the laser engages the volume of material in a particular location, for example in the centre. If the laser beam engages the volume of material centrally, then the displacement from the stream of material is likely to be at its maximum. In some examples, it may be intended to direct the laser beam such that the laser engages the volume of material in a particular location away from the centre of the volume.

Figure 2:
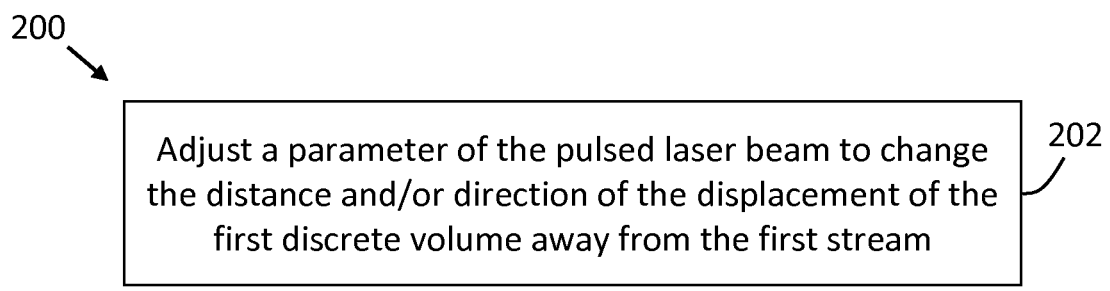
FIG. 2 is a flowchart of an example of a further method of displacing material.

As noted above, various parameters may be adjusted in order to control the manner (e.g. the amount and the direction) of the displacement of the volume of material from the stream of material. FIG. 2 is a flowchart of a further example of a method 200 for displacing material. The method 200 may include any of the blocks from the method 100 above. The method 200 comprises, at block 202, adjusting a parameter of the pulsed laser beam to change the distance and/or direction of the displacement of the first discrete volume away from the first stream. As indicated above, the parameter to be adjusted may include the wavelength of the radiation, the power and/or energy of the radiation, the pulse duration, the pulse repetition rate, the location at which the laser beam interacts with the volume of material and/or the spot size of the radiation beam when it interacts with the material. Other parameters may also be adjusted. Adjustment of a parameter may be achieved automatically, for example by a controller connected to a laser source generating the laser beam, or manually, for example by a user adjusting a component of the laser source or providing an input into the laser source controller.

In some examples, increasing the energy of the laser pulses may cause a greater impulse force to act upon the volume of material, thereby causing a relatively greater displacement from the stream of material. The distance by which the volume of material is displaced from the stream, or the angle from the stream by which the volume of material is displaced may, in some examples, increase proportionally with an increase in laser energy.

Volumes of material from the stream of material may, in some examples, be displaced into a discrete number of alternative trajectories. For example, parameters of the laser beam may be such that any volumes of material engaged by laser pulses will be displaced by the same distance and in the same direction and, as such, will be displaced to the same resulting location. Such an arrangement may be used for example when it is intended for some volumes of material from the stream to be deposited in a first location (i.e. not displaced from the stream) and other volumes of material from the stream to be displaced from the stream, to end up in a second location. The second location may comprise a receptacle, such that material which is displaced into the receptacle may be recycled or reused. This arrangement may be used in printing systems, for example, where print agent which is not to be deposited onto a printable substrate may be displaced into the receptacle and transferred back to a print agent reservoir.

In a similar example, parameters of the laser beam may be such that, under a first set of laser parameters, volumes of material engaged by laser pulses will be displaced to a first resulting location and, under a second set of laser parameters, volumes of material engaged by laser pulses will be displaced to a second resulting location. Such an arrangement may be used when it is intended for material to be displaced into multiple discrete locations.

In other examples, volumes of material from the stream of material may be displaced variably over a range of trajectories. That is to say, material may be displaced to any intended location within a defined area. In this way, parameters of the laser may be varied continuously to cause the intended displacement of material from the stream of material to be deposited in an intended location. Such an arrangement may be used, for example, in an additive manufacturing system, where discrete volumes of build material may be provided in a stream, and each discrete volume may be selectively displaced from the stream so that it travels in an intended trajectory, causing it to be deposited in an intended location on the print bed.

Figure 3:
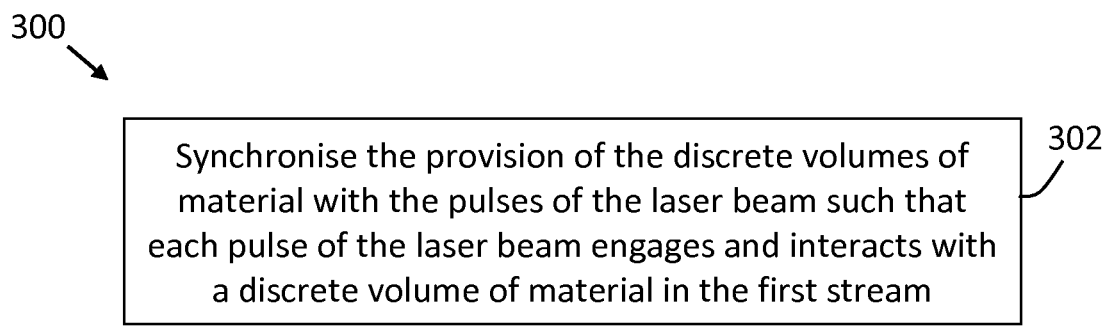
FIG. 3 is a flowchart of an example of a further method of displacing material.

FIG. 3 is a flowchart of a further example of a method 300 for displacing material. The method 300 may include any of the blocks from the methods 100, 200 above. The method 300 comprises, at block 302, synchronising the provision of the discrete volumes of material with the pulses of the laser beam such that each pulse of the laser beam engages and interacts with a discrete volume of material in the first stream. In other words, the generation of laser pulses may be synchronised with the generation or provision of the volumes of material so that the pulses hit the intended volumes of material. In examples in which the material exists in discrete volumes (e.g. powder-like), then the provision of the volumes of material may be controlled so that volumes of material are in the intended position to be engaged by laser pulses at an intended rate. In examples in which the material is caused to form into volumes of material (e.g. using a piezo-electric vibration device), then the device used to cause the formation of the volumes may be synchronized with the laser pulses, such that the laser pulses engage the intended volumes of material.

In some examples, each laser pulse may engage a single volume of material in the stream of volumes of material. In this way, the pulse frequency may be considered to be equal to a volume supply frequency (i.e. the volume generation frequency or the volume provision frequency). In other examples, the pulse frequency may be set to half of the volume supply frequency, such that every other volume of material in the stream is engaged by a laser pulse and, therefore, displaced from the stream. By varying the pulse frequency and/or synchronising the laser pulses with the volume provision, an intended amount of displacement of material may achieved.

Synchronisation of the provision of the volumes of material and the laser pulses may be achieved, in some examples, by causing the volumes of material to be provided with a defined space between adjacent volumes. Thus, in some examples, the discrete volumes of material in the first stream may be regularly spaced. However, the volumes of material may, in some examples, be provided with irregular spacing. In such examples, a sensor may be used to determine when a volume of material has been generated or provided into the stream of material, and the laser source may be caused to generate a laser pulse to coincide with particular volumes of material.

Figure 4:
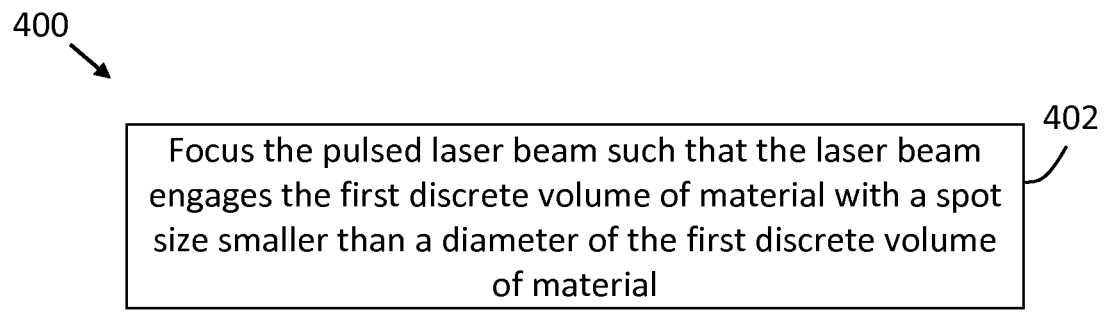
FIG. 4 is a flowchart of an example of a further method of displacing material.

FIG. 4 is a flowchart of a further example of a method 400 for displacing material. The method 400 may include any of the blocks from the methods 100, 200, 300 above. The method 400 comprises, at block 402, focusing the pulsed laser beam such that the laser beam engages the first discrete volume of material with a spot size smaller than a diameter of the first discrete volume of material. In this way, all of the energy of the laser beam is provide to the volume of material, and laser energy is not wasted. It is to be noted, however, that, in other examples, the method may comprise focusing the pulsed laser beam such that the laser beam engages the first discrete volume of material with a spot size larger than a diameter of the first discrete volume of material. In this way, a single laser pulse may be sufficiently large to engage multiple volumes of material, thereby causing multiple volumes of material to be displaced with a single laser pulse.

Figure 5:
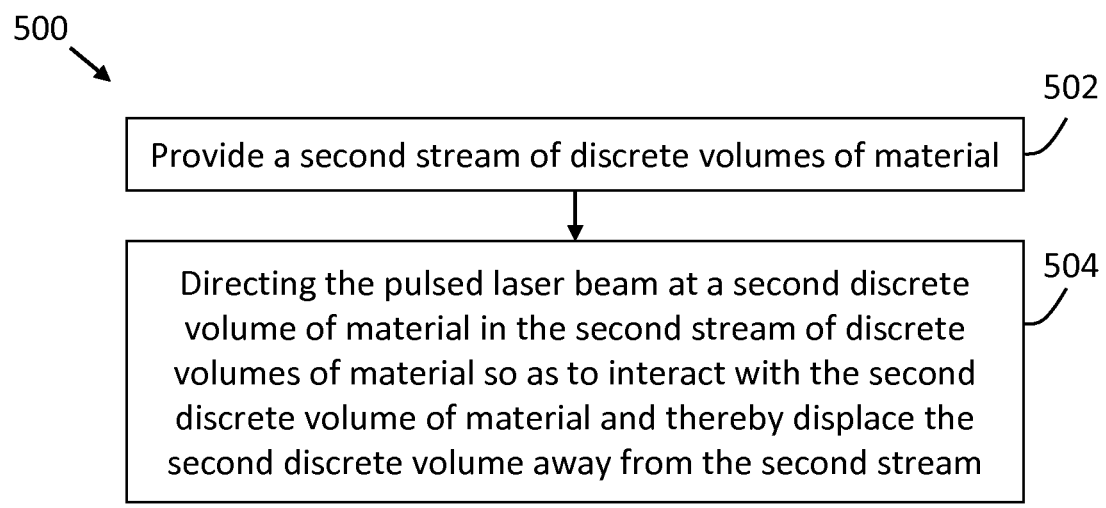
FIG. 5 is a flowchart of an example of a further method of displacing material.

In some examples, the pulsed laser beam may be used to engage volumes of material in multiple streams of volumes of material, such that material from multiple streams of material may be selectively displaced using a single laser source. In this regard, FIG. 5 is a flowchart of a further example of a method 500 for displacing material. The method 500 may include any of the blocks from the methods 100, 200, 300, 400 above. The method 500 comprises, at block 502, providing a second stream of discrete volumes of material. The second stream of material may be provided from the same source as the first stream of material, or from a different source. At block 504, the method 500 comprises directing the pulsed laser beam at a second discrete volume of material in the second stream of discrete volumes of material so as to interact with the second discrete volume of material and thereby displace the second discrete volume away from the second stream. Thus, the same laser beam may be used to displace material from both the first and second streams of volumes of material. This may improve efficiency, by enabling more material to be displaced with fewer resources.

Figure 6:
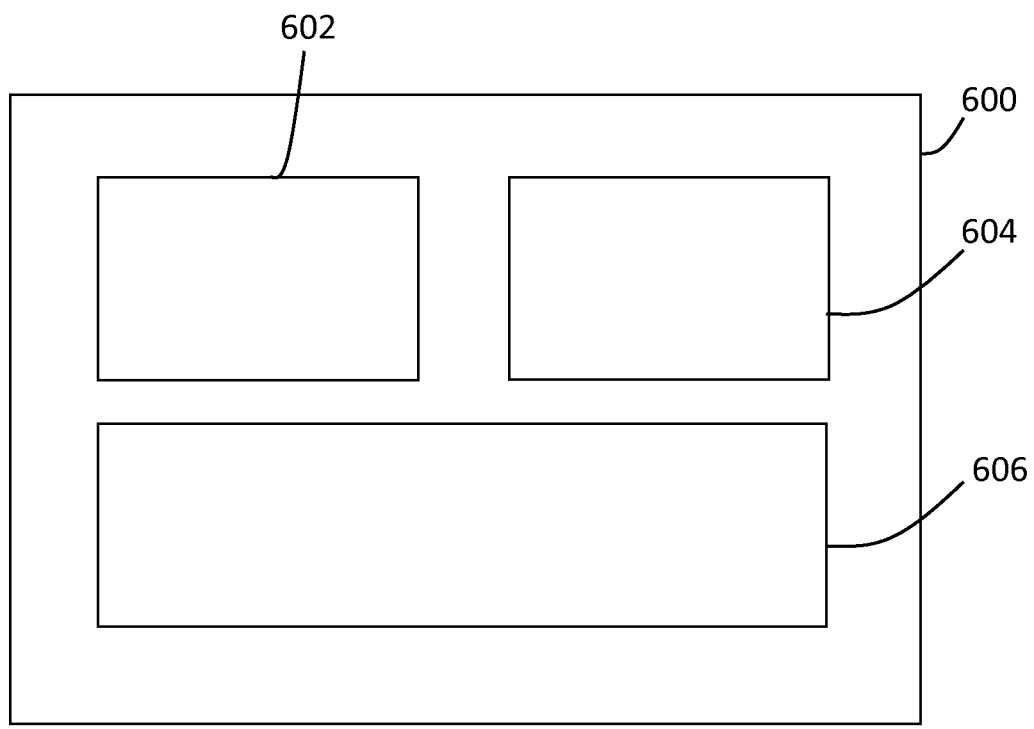
FIG. 6 is a simplified schematic of an example of apparatus for displacing material.

The methods described above may be performed by a material displacement apparatus or a material displacement system. FIG. 6 is a simplified schematic of an example of apparatus 600 for displacing material or matter. The apparatus 600 comprises a radiation source 602 to generate a pulsed beam of radiation. The radiation source 602 may, in some examples, comprise a laser source. The laser source may, for example, emit radiation (e.g. a laser beam) having a wavelength falling within a range of between around 10 nanometres and around 1 millimetre (i.e. between ultraviolet and infrared radiation). The apparatus 600 further comprises an optical component 604 to direct the beam of radiation towards a flow of defined volumes of matter. In some examples, the optical component 604 may also focus the beam of radiation into a defined spot size at the point at which the beam engages the defined volumes of matter. In other examples, the apparatus 600 may comprise an additional optical component (not shown) to focus the beam of radiation.

The flow of defined volumes of matter may comprise a stream or procession of defined volumes (e.g. in a single-file manner). The defined volumes may be regularly spaced, as noted above, or irregularly spaced. The defined volumes may be provided by, or from, a device which stores material and provides, or creates, the flow of defined volumes from the material.

The apparatus 600 further comprises processing apparatus 606. The processing apparatus 606 may be operatively connected to the radiation source 602 and/or to the optical component 604. The processing apparatus 606 may control the radiation source 602 such that the pulsed beam of radiation engages a defined volume of matter in the flow of defined volumes of matter to urge the defined volume of matter away from the flow of defined volumes of matter. By urging the defined volume of matter away from the flow of defined volumes of matter, the defined volume of matter may be displaced, such that it takes a trajectory that differs from the trajectory of the matter in the flow of defined volumes.

The processing apparatus 602 may, in some examples, be to control the radiation source 602 to adjust a parameter of the pulsed beam of radiation. Examples of parameters of the radiation beam which may be adjusted by the processing apparatus 602 are discussed above with reference to FIG. 2. In some examples, the parameter of the pulsed beam of radiation to be adjusted may comprise an energy of the radiation, a wavelength of the radiation, a diameter of the beam, a pulse duration, and/or a pulse frequency.

Figure 7:
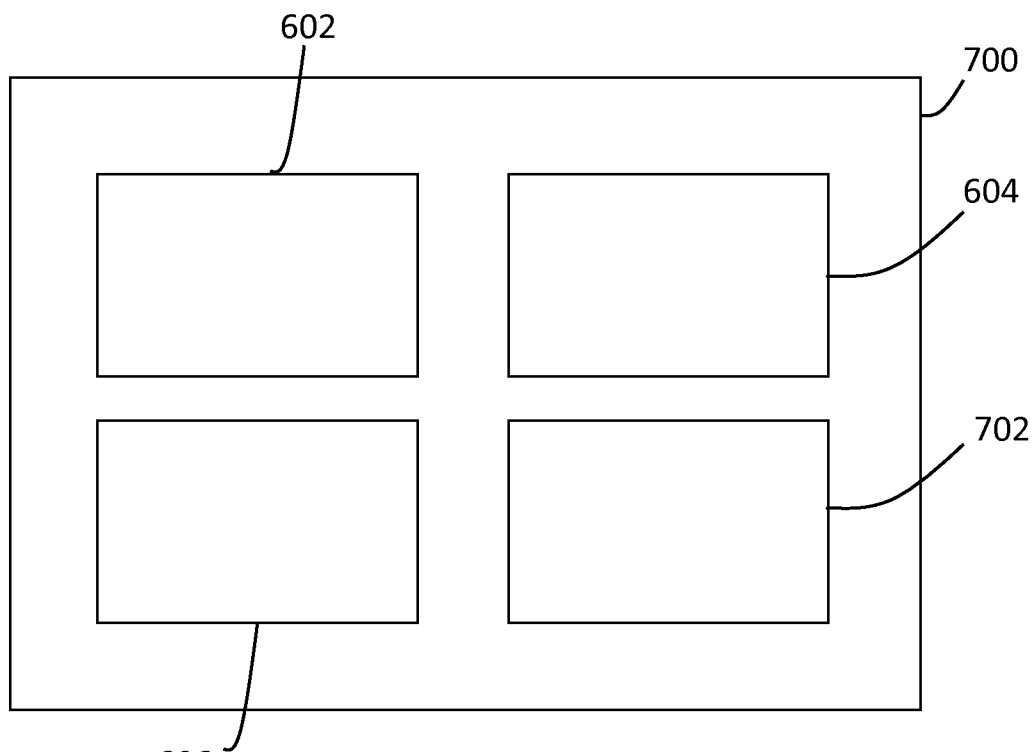
FIG. 7 is a simplified schematic of a further example of apparatus for displacing material.

FIG. 7 is a simplified schematic of a further example of apparatus 700 for displacing material or matter. The apparatus 700 comprises the radiation source 602, the optical component 604 and the processing apparatus 606, and further comprises a receptacle 702 to receive the defined volume of matter urged away from the flow of defined volumes of matter. As noted above, the receptacle 702 may serve to collect matter which is displaced from (i.e. urged away from) the flow of matter. In this way, matter collected in the receptacle 702 may be reused or recycled, thereby reducing waste.

Figure 8:
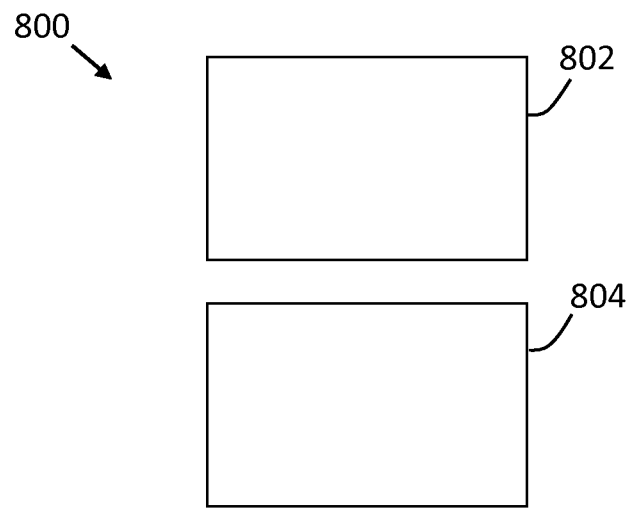
FIG. 8 is a simplified schematic of an example of a system for displacing material.

FIG. 8 is a simplified schematic of an example of a system 800 for displacing material. The system 800 comprises a material source 802 to provide a stream of morsels of material. The system 800 further comprises a laser source 804 to generate a pulsed laser beam. The laser beam may be aimed so as to contact a morsel of material in the stream of morsels of material to cause the morsel of material to be displaced from the stream of morsels of material. As explained above, by aiming the laser beam so that it contacts and interacts with the morsel of material, the morsel of material may be displaced from the stream of morsels by an intended amount. The trajectory can be controlled so that the morsel of material ends up in a particular intended location.

The material source 802 may be such that material is supplied in a stream of morsels naturally (e.g. material exists in morsels, or defined volumes, or material breaks up into morsels without the application of additional intervention). In other examples, an additional device, such as piezo-electric device, (not shown in FIG. 8) may be used to create the stream of morsels of material.

In some examples, the system 800 may comprise a printing system, wherein the material comprises print agent. In other examples, the system 800 may comprise an additive manufacturing system, wherein the material comprises build material.

In examples where the system 800 comprises a printing system, morsels of material may be displaced for various applications. For example, the material may be used as a coating to be selectively applied to a substrate, to components attached to a substrate, or to another surface. In another example, the material may comprise a conductive material, such as copper, to be selectively deposited onto a substrate so as to form a conductive track of a printed circuit board. A printed circuit board design may be provided, for example to a processing apparatus in communication with the material source 802 and the laser source 804, and the material source and the laser source may be controlled to selectively deposit the conductive material in the intended design.

In examples where the system 800 comprises an additive manufacturing system, morsels of build material may be selectively deposited on a layer-by-layer basis on a print bed. In this way, a single stream of material may be used, and individual morsels of the material may be urged away, or displaced, from the stream such that they are deposited onto the print bed at an intended location, for example in a pattern defined in a model of an object to be manufactured.

Figure 9:
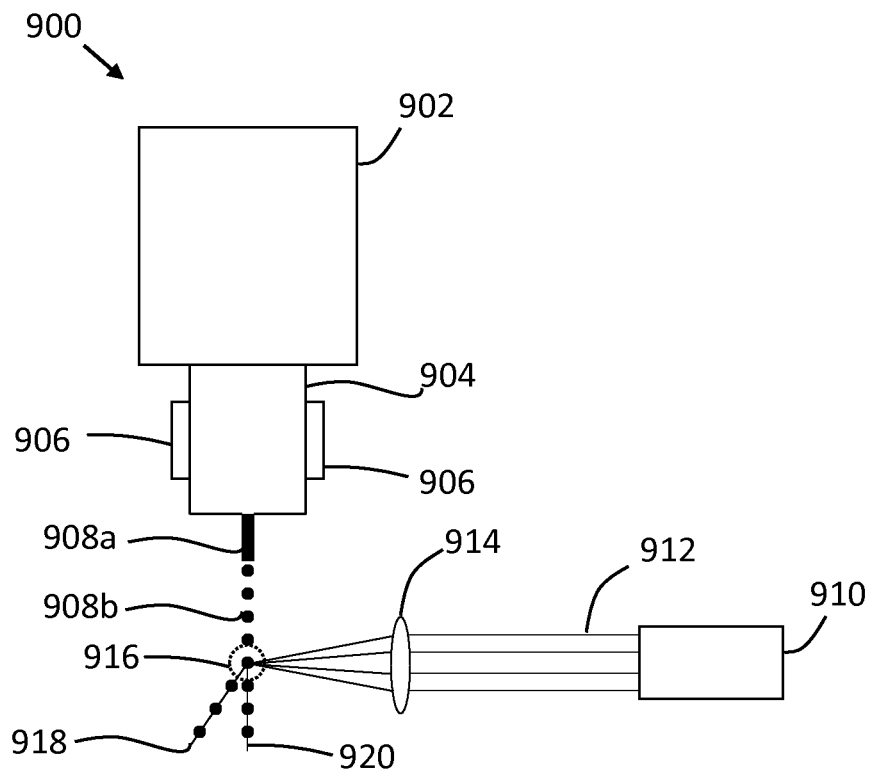
FIG. 9 is a simplified schematic of a further example of a system for displacing material.

A specific example of a system 900 for displacing material is shown in FIG. 9. The system 900 comprises a material source 902 for containing material which, in this example, is in liquid form. Material is fed from the material source 902 through a delivery module 904. A piezo-electric device 906 applies vibrations to the delivery module 904 at a defined frequency. As material 908 exits the delivery module 904 in the form of a jet 908a, the vibrations from the piezo-electric device 906 cause the material to break or divide into a stream 908b discrete, or defined, volumes, or morsels, of material. The system 900 of this example also includes a laser source 910 which generates a pulsed laser beam 912. An optical component, such as a lens 914 focuses and directs the laser beam into a point or a spot such that, when the laser beam engages a morsel in the stream 908b of morsels of material, the laser beam 912 has a defined spot size. The laser beam 912 engages a morsel in the stream 908b of morsels of material at the location labelled 916. Any morsel of material which is hit by a pulse of the laser beam 912 is caused to displace from the stream 908b such that it travels along a trajectory indicated by the line 918. Those morsels of material which are not hit by the laser beam 912 are not displaced from the stream 908b and, therefore, continue along a trajectory indicated by the line 920.

As noted above, the efficiency of the system 800 or 900 may be improved by using the laser beam from a single laser source, such as the laser source 804 or 910, to engage and interact with morsels of material from multiple streams of morsels of material. In this way, the cost of multiple laser sources may be saved.

In order to use the laser beam from a single pulsed laser source, such as a pulsed ytterbium fibre laser source, to interact with material from multiple streams of material, additional components may be employed. The multiple streams of material may be provided from multiple nozzles of a print head of a print apparatus, for example. Thus, a print head may, in one example include an array of N nozzles, and it may be intended that matter from each of the nozzles is to be displaced by a defined distance, or in a defined direction. A beam splitter may be used to split a laser beam from the laser source into multiple beams. In some examples, the beam splitter may split the laser beam into as many beams as there are streams of material. Thus, in the above print head example, the beam splitter may split the laser beam into N beams; one beam for each nozzle in the array of nozzles. The system may further include a modulator, or multiple modulators arranged, for example, in an array, to control the power of the beams split by the beam splitter. In some examples, the system may include one modulator for each split beam. So, in the above print head example, the system may include N modulators. Depending on the application of the system, various modulators may be used. For example, the modulators may comprise acousto-optic modulators, micromechanical modulators, electro-absorption modulators, fibre-optic modulators and/or liquid crystal modulators. The system may further comprise optical fibres to receive the split beams. In some examples, the system may comprise an optical fibre for each split beam (i.e. N optical fibres in the above print head example). The optical fibres may be arranged in an array, such as a V-groove array, in order to effectively receive the multiple laser beams. In some examples, the system may further include spherical lenses to focus the laser beams on the morsels of material.

In such an example system in which a single laser source is used to displace matter from multiple streams, synchronisation between the laser pulses and the generation of morsels in multiple streams of material may result in high levels of efficiency. Such synchronisation may be achieved by using a device, such as piezo-electric device, to break multiple streams of material into morsels/discrete volumes simultaneously, and in a synchronised manner. In this way, a plurality of morsels of material may be created simultaneously, each from a different stream of matter. Therefore, the split laser beams may be synchronised with the plurality of morsels, to thereby displace the plurality of morsels at the same time.

Figure 10:
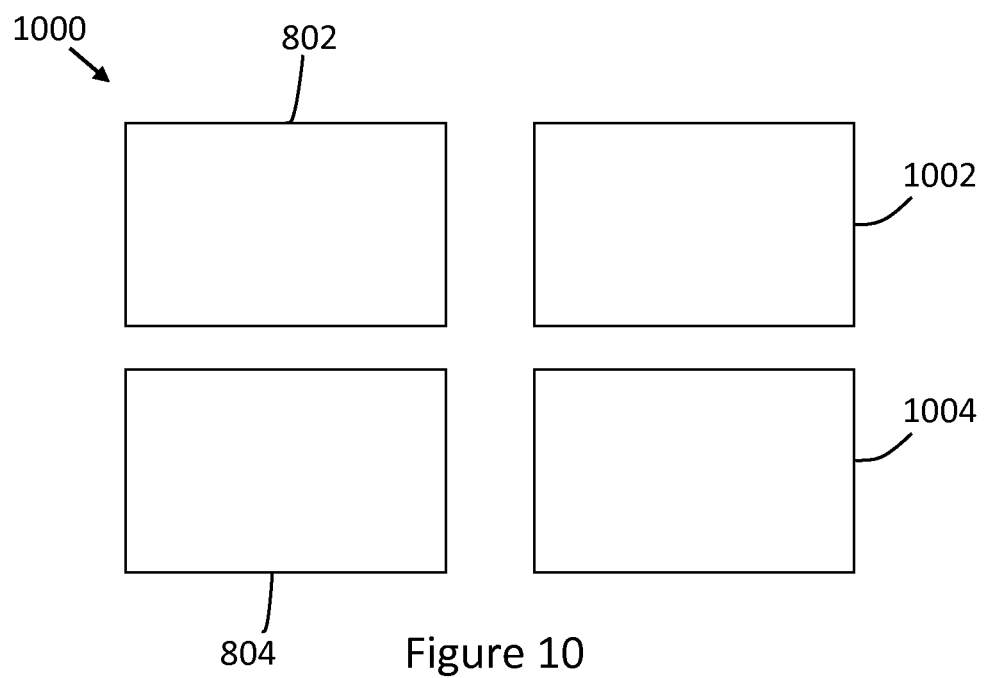
FIG. 10 is a simplified schematic of a further example of a system for displacing material.

FIG. 10 is a simplified schematic of an example of a system 1000 for displacing material. The system 1000 may be used to displace material from multiple streams of material using a single laser source. The system 1000 may include components from the system 800 described above. Specifically, the system 1000 comprises the material source 802 and the laser source 804. The system 1000 further comprises a beam splitter 1002 to split the pulsed laser beam into a plurality of pulsed laser beams. Each pulsed laser beam of the plurality of pulsed laser beams is aimed so as to contact a morsel of material in a corresponding stream in the plurality of streams of morsels of material.

The system 1000 may further comprise an optical modulator 1004 to control a parameter of a pulsed laser beam of the plurality of pulsed laser beams. In some examples, the parameter to be controlled may comprise a power or an energy of the laser beam.

Examples in the present disclosure can be provided as methods, systems or apparatus.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart.

While the method, apparatus and related aspects have been described with reference to certain examples, various modifications, changes, omissions, and substitutions can be made without departing from the spirit of the present disclosure. It is intended, therefore, that the method, apparatus and related aspects be limited just by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
providing a first stream of discrete volumes of material;
directing a pulsed laser beam at a first discrete volume of material in the first stream of discrete volumes of material so as to interact with the first discrete volume of material and thereby displace the first discrete volume away from the first stream; and
synchronizing provision of the discrete volumes of material with pulses of the laser beam such that each pulse of the laser beam engages and interacts with a discrete volume of material in the first stream.

2. A method according to claim 1, further comprising:
adjusting a parameter of the pulsed laser beam to change the distance and/or direction of the displacement of the first discrete volume away from the first stream.

3. A method according to claim 1, further comprising:
focusing the pulsed laser beam such that the laser beam engages the first discrete volume of material with a spot size smaller than a diameter of the first discrete volume of material.

4. A method according to claim 1, wherein a pulse of the pulsed laser beam has a pulse duration of less than 100 nanoseconds.

5. A method according to claim 1, wherein the discrete volumes of material in the first stream are regularly spaced.

6. A method according to claim 1, further comprising:
providing a second stream of discrete volumes of material; and
directing the pulsed laser beam at a second discrete volume of material in the second stream of discrete volumes of material so as to interact with the second discrete volume of material and thereby displace the second discrete volume away from the second stream.

7. Apparatus comprising:
a radiation source to generate a pulsed beam of radiation;
an optical component to direct the beam of radiation towards a flow of defined volumes of matter; and
processing apparatus to:
control the radiation source such that the pulsed beam of radiation engages a defined volume of matter in the flow of defined volumes of matter to urge the defined volume of matter away from the flow of defined volumes of matter; and
control the radiation source to adjust a parameter of the pulsed beam of radiation.

8. Apparatus according to claim 7, further comprising:
a receptacle to receive the defined volume of matter urged away from the flow of defined volumes of matter.

9. Apparatus according to claim 7, wherein the parameter of the pulsed beam of radiation is an energy of the radiation, a wavelength of the radiation, a diameter of the beam, a pulse duration, and/or a pulse frequency.

10. A system comprising:
a material source to provide a plurality of streams of morsels of material;
a laser source to generate a pulsed laser beam; and
a beam splitter to split the pulsed laser beam into a plurality of pulsed laser beams;
wherein each pulsed laser beam is aimed so as to contact a morsel of material in a corresponding stream of morsels of material to cause the morsel of material to be displaced from the corresponding stream of morsels of material.

11. A system according to claim 10, wherein the system comprises one of:
a printing system, wherein the material comprises print agent; and
an additive manufacturing system, wherein the material comprises build material.

12. A system according to claim 10, further comprising:
an optical modulator to control a parameter of each pulsed laser beam of the plurality of pulsed laser beams.

* * * * *